United States Patent

[11] 3,583,794

| [72] | Inventor | Joel S. Newman |
| | | Framingham, Mass. |
| [21] | Appl. No. | 806,781 |
| [22] | Filed | Mar. 10, 1969 |
| [45] | Patented | June 8, 1971 |
| [73] | Assignee | Biometrics, Inc. |
| | | Cambridge, Mass. |

[54] DIRECT READING EYE MOVEMENT MONITOR
15 Claims, 8 Drawing Figs.

| [52] | U.S. Cl. | 351/6, 351/7 |
| [51] | Int. Cl. | A61b 3/10, A61b 3/14 |
| [50] | Field of Search | 351/6, 7, 1, 39 |

[56] References Cited
UNITED STATES PATENTS

| 2,964,644 | 12/1960 | Hobrough | 351/7UX |
| 3,450,466 | 6/1969 | Streisinger | 351/7 |
| 3,462,604 | 8/1969 | Mason | 351/6X |
| 3,473,868 | 10/1969 | Young et al. | 351/6 |

*Primary Examiner*—David Schonberg
*Assistant Examiner*—Paul A. Sacher
*Attorney*—Wolf, Greenfield and Sacks ABSTRACT: A direct reading eye position and movement monitor with a lens system for projecting images of the eyes of the subject on a screen, a signal generator or transducer assembly directed at the interface of two portions of the eyes with distinctly different light reflecting properties, and a two-channel recorder connected to the output of the transducer assembly to record the separate output signals generated as a result of movement of the eyes of the subject.

INVENTOR.
JOEL S. NEWMAN

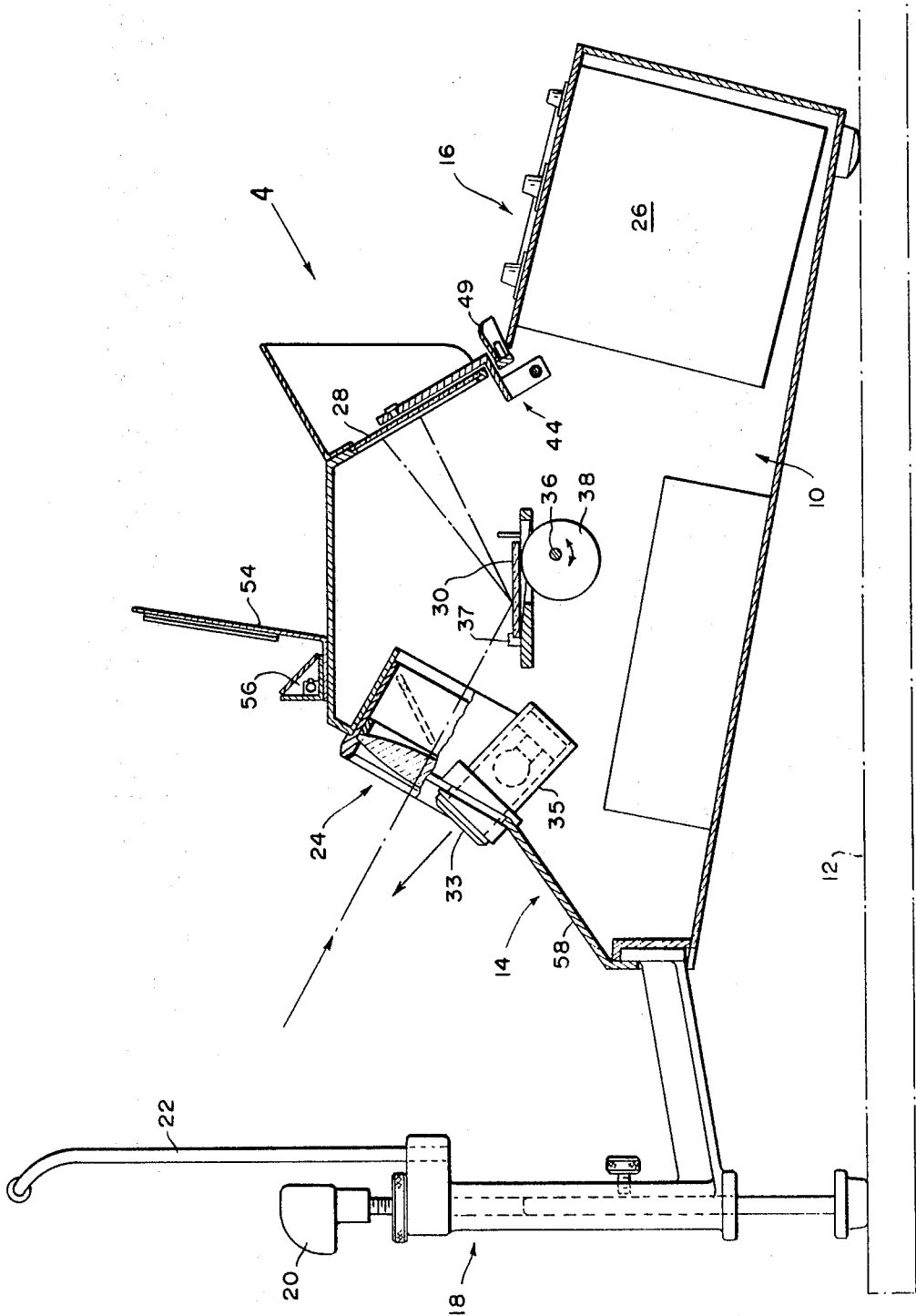

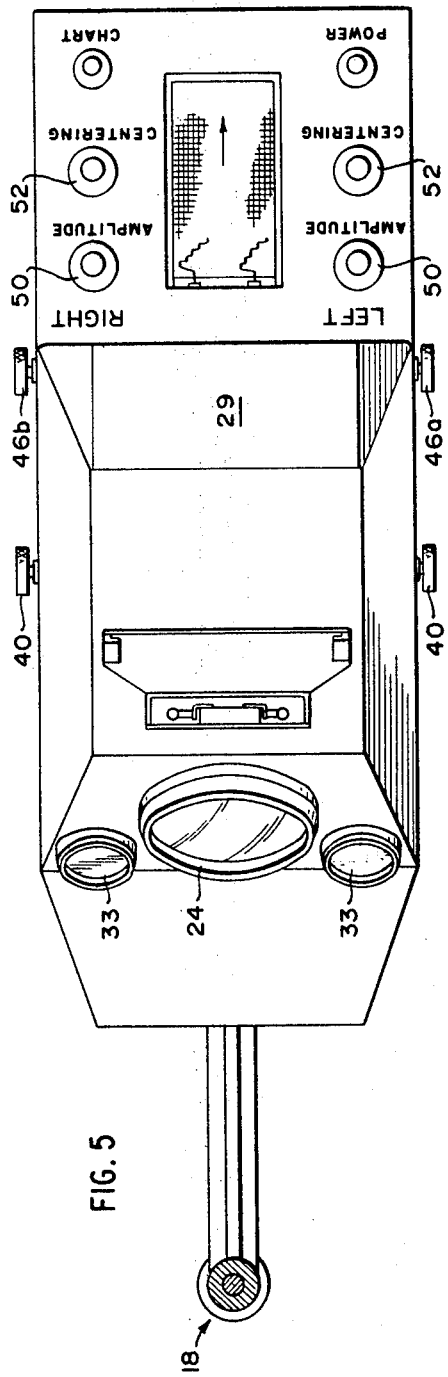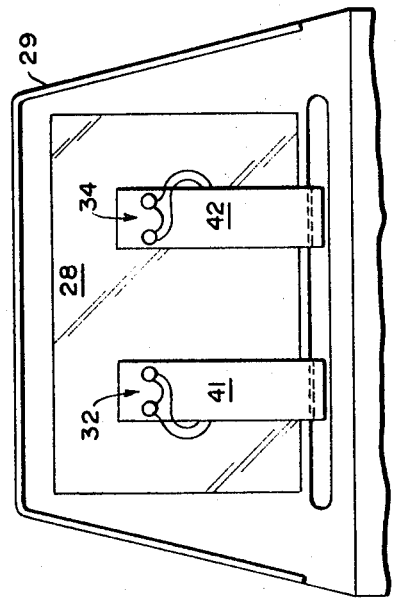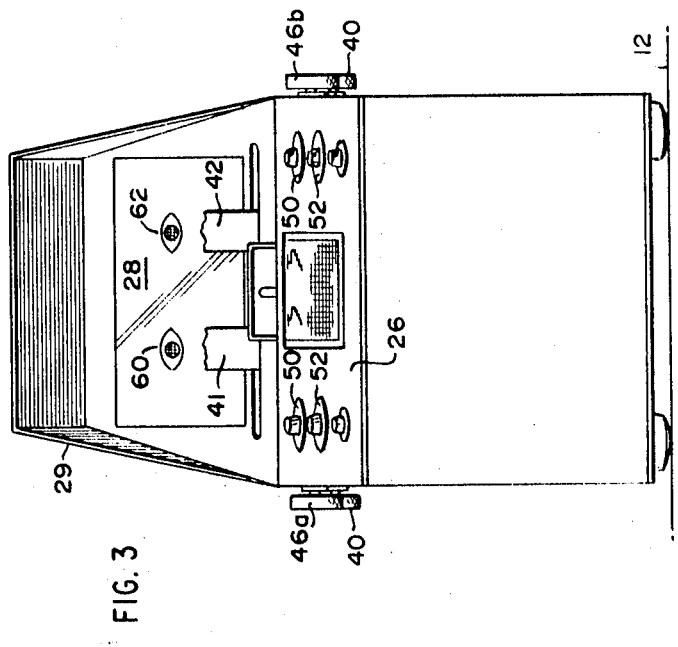

INVENTOR.
JOEL S. NEWMAN

ATTORNEYS

DIRECT READING EYE MOVEMENT MONITOR

This invention relates to the measurement and recording of eye movements and position. The device is particularly useful in the evaluation of reading patterns and the diagnosis of any attendant difficulties, as well as the recording of nystagmus.

The prior art known to the inventor generally falls into two categories, namely, electro-oculography and eye movement photography. In electro-oculography electrodes are normally secured to the face of the subject in the vicinity of the eyes, and the varying surface potentials which result from eye movement are measured. This system is inaccurate and noise sensitive, and it suffers from severe baseline drift problems. In eye movement photography, a light source and corneal reflection are utilized to produce a dot of light which moves in conjunction with the eyes. The light dot is recorded on a strip of moving film. This system is expensive, hard to use, and does not give an immediate recording of eye movement because of the requirement that the film be developed before it can be read. The system has met with only limited acceptance in the profession because of the relatively high cost of film and the attendant delays due to film processing requirements.

A principal object of this invention is to provide a simple, economical, and instantaneously usable recording of eye movements.

To accomplish this and other objects of the invention, the monitor includes among its features a recorder which makes its recordings on heat sensitive strip paper which does not require processing and costs only a small fraction of photographic film employed in the eye movement photography technique. Further, in accordance with this invention electrodes are eliminated and a complete eye image is projected on a screen which in turn is used to produce the recording. The device is very simple to operate as compared to the systems of the prior art, and it lends itself therefore to successful application by unskilled persons. As a result, the monitor of this invention is particularly useful in reading evaluation and diagnostic programs conducted in the primary and secondary grades of public school systems. It is also very useful in ophthalmic, optometric and other medical clinics.

These and other objects and features of this invention along with its incident advantages will be better understood and appreciated from the following detailed description of one embodiment thereof, selected for purposes of illustration and shown in the accompanying drawing in which:

FIG. 2 is a cross-sectional view taken through the eye movement monitor;

FIG. 3 is a rear end view of the eye movement monitor with the photocells removed to show the manner in which the images of the eyes of the subject are projected on the screen;

FIG. 4 is a fragmentary end view similar to FIG. 3 and showing the photocells in place;

FIG. 5 is a top view of the monitor;

Figure 1:
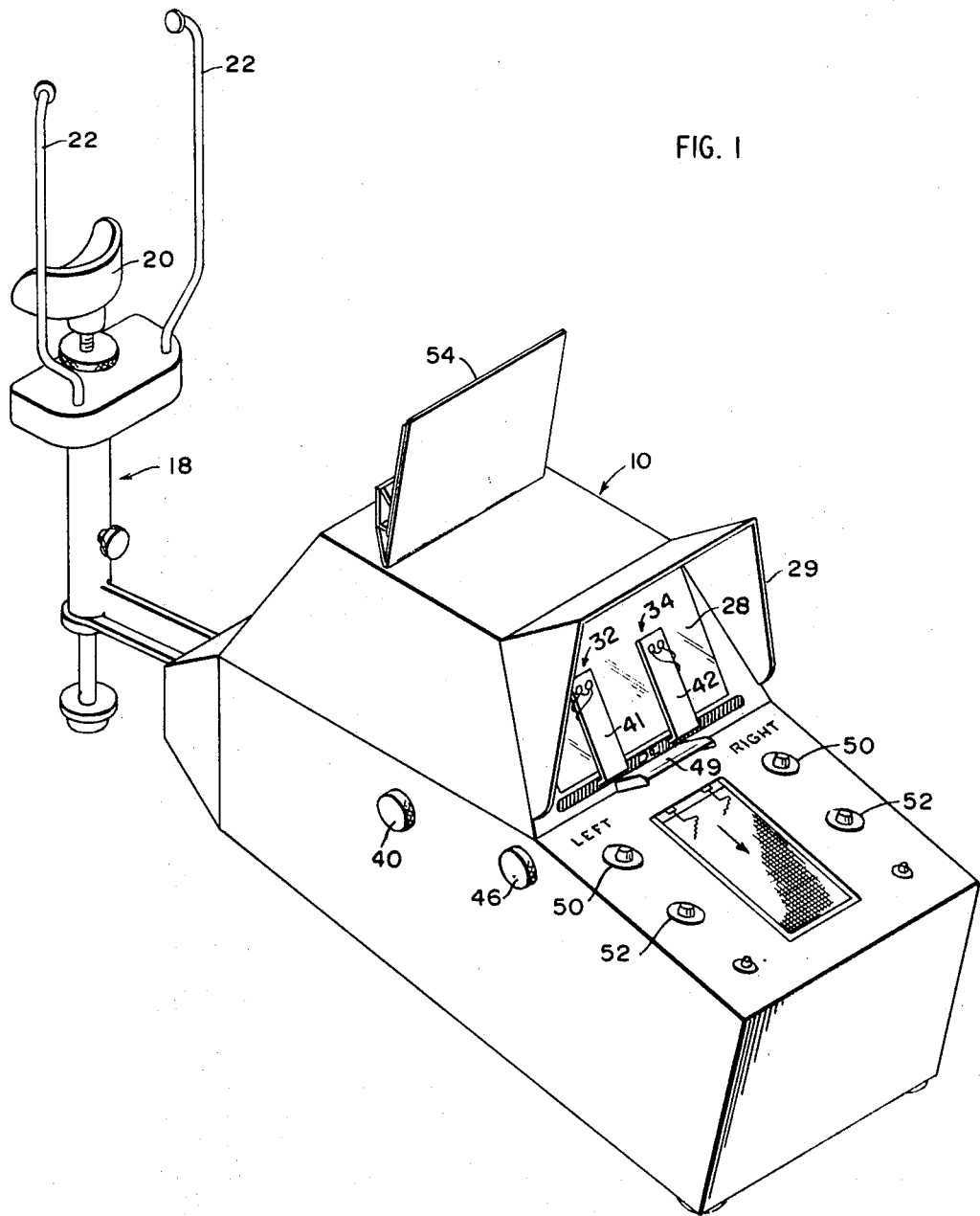
FIG. 1 is a perspective view of the eye movement monitor of this invention.

The direct reading eye movement monitor shown in the drawing includes a housing 10 designed to be supported on a table or some similar surface as suggested at 12 with the subject seated at the front end 14 and the operator at the rear end 16. The front end 14 of housing 10 is connected to a head steadying frame 18 that includes a chin rest 20 and a head bar 22 that extends about the sides of the face of the subject to the temples to assist in aligning and steadying the subject's head and more particularly his eyes with respect to the lens system 24 mounted on the front face of housing 10.

The housing 10 carries a recorder 26 at its rear end 16, and above the recorder is a ground glass screen 28 shaded by hood 29 and upon which the eyes of the subject are projected. A pair of independently movable mirrors 30 (one is shown) are mounted inside the housing and cooperate with the lens system 24 to project the eye images on the screen. Two independent pairs of photocells 32 and 34 are mounted on the housing immediately in front of the screen 28 and each is movable independently of the other so that the operator may direct the photocells at the interface of two portions of the eye of different reflecting qualities. As is explained in greater detail below, the adjustments of the photocells and the mirrors 30 enable the operator to precisely align the photocells with respect to the eye images on the screen.

A pair of incandescent lamps 33 are mounted on the housing in sleeves 35 immediately adjacent the lens system 24. The lamps 33 are positioned and focused to illuminate the eyes of the subject, and each may be provided with an infrared filter in order not to distract the subject during the monitoring of the eyes. With the subject's head positioned on the frame 18, the lens system 24 is designed to direct the images of the eyes onto the two mirrors 30 disposed in the housing 10, and the mirrors 30 in turn reflect the image onto the ground glass screen 28 as shown in FIG. 3. Each of the mirrors is pivoted at its front edge 37, and each is engaged by an eccentric 38 member on shaft 36 which in turn is rotated by control knob 40. It is evident from an inspection of FIG. 2 that when the mirrors 30 are pivoted about their edges 37 by means of the knobs 40, the images of the eyes will be deflected up or down on the ground glass screen 28 depending upon the direction in which the mirrors are pivoted. And because each mirror is independently supported with its own eccentric and control knob; the vertical orientation of each eye image on the screen may be altered independently of the other.

The two separate pairs of photocells 32 and 34 are respectively carried on transparent panels 41 and 42, which panels are supported on separate lead screws and blocks generally designated 44 which are in turn operated by the control knobs 46. The knob designated 46a controls the photocell pair 32 which in turn observes the image of the subject's left eye, while the knob 46b controls the right pair 34 of photocells which in turn observes the right eye image.

The panels 41 and 42 lie immediately behind the screen 28 so that rotation of the knob 46a and 46b move the panels left and right to accommodate the spacing of the images of the eye on the screen. In FIG. 3 the eye images on the screen are suggested, and the images may be moved up and down by the knobs 40 while the panels 41 and 42 may be moved horizontally so as to accommodate spacing. Thus it is evident that the pairs of photocells 32 and 34 may be directed toward any selected portion of each eye of the subject. While in this preferred embodiment the movable panels 41 and 42 accommodate horizontal alignment of the photocells with the eye images, it will be appreciated that a second set of mirrors similar to the mirrors 30 could be utilized to move the images horizontally for that purpose.

Figure 6:
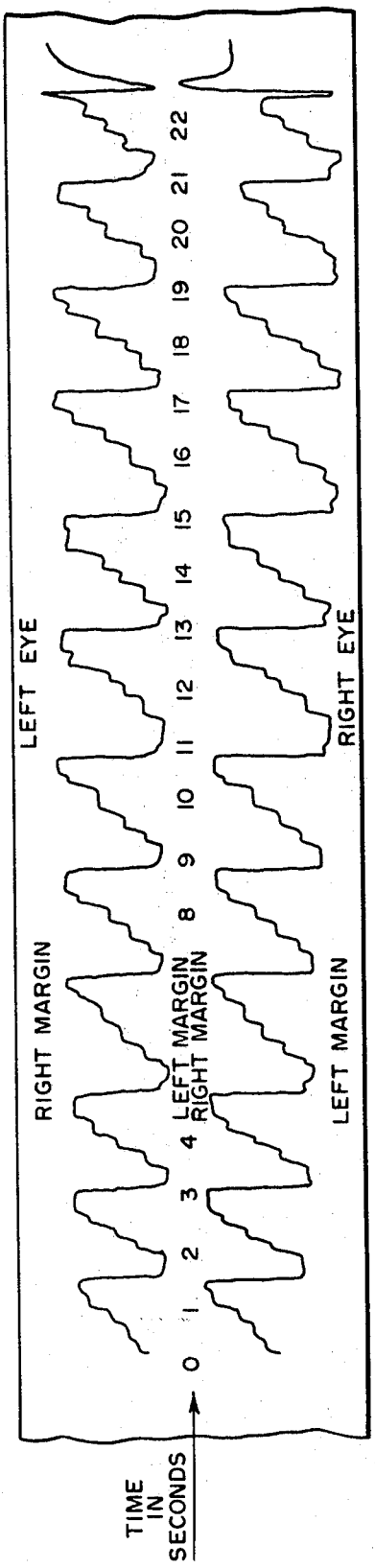
FIG. 6 is a showing of a strip recorded on the monitor.
Figure 6A:
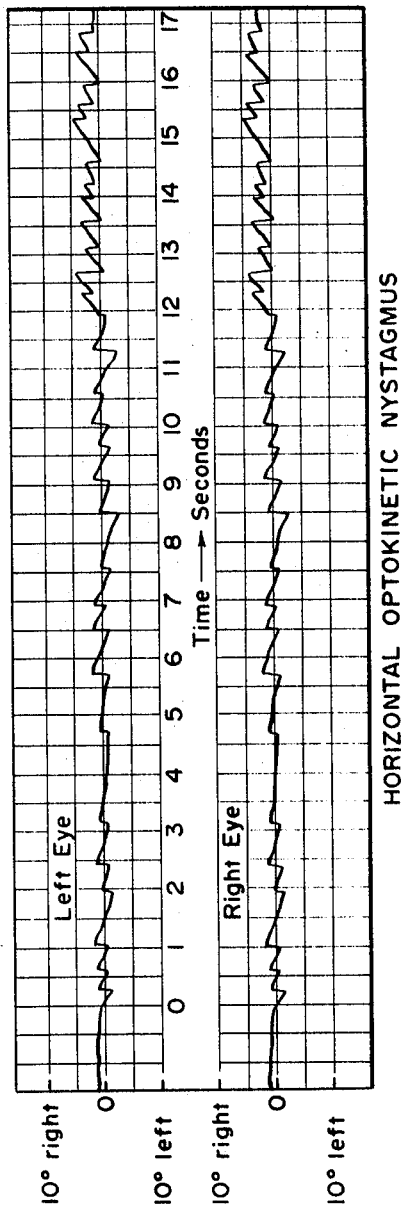
FIG. 6A is a recording of normal optokinetic nystagmus.

The recorder 26 is designed to record on heat sensitive strip chart paper the output of each of the pairs of photocells 32 and 34. Thus, the recorder 26 produces as shown in FIGS. 6 and 6A two separate graphs. The graph of FIG. 6 suggests the step-by-step movement of each eye as the subject reads lines of print and the swing back of the eyes from the right to the left margin of the reading material. This is explained in greater detail below. The recorder illuminated by light 49 has separate amplitude and centering control dials 50 and 52 for each eye so that the stylus of each track may be set independently of one another. The recorder is of standard design and is not claimed per se as the invention of this application.

An easel 54 is mounted on the housing 10 above the lens system 24 and is designed to support the material to be read by the subject. A light 56 is provided for the easel. The reading material may also be placed on the surface 58 disposed beneath the lens system 24 on the front of the housing as an alternate position for the subject. This alternate position will of course accommodate subjects with bifocal glasses. The easel itself preferably is removable from the housing so that other charts and targets (wall mounted, moving lights, nystagmus inducing etc.) may be used in place of other material which would ordinarily be mounted on the easel. For example the easel may be replaced by an illuminated nystagmus drum which may plug into the easel socket.

Figure 7:
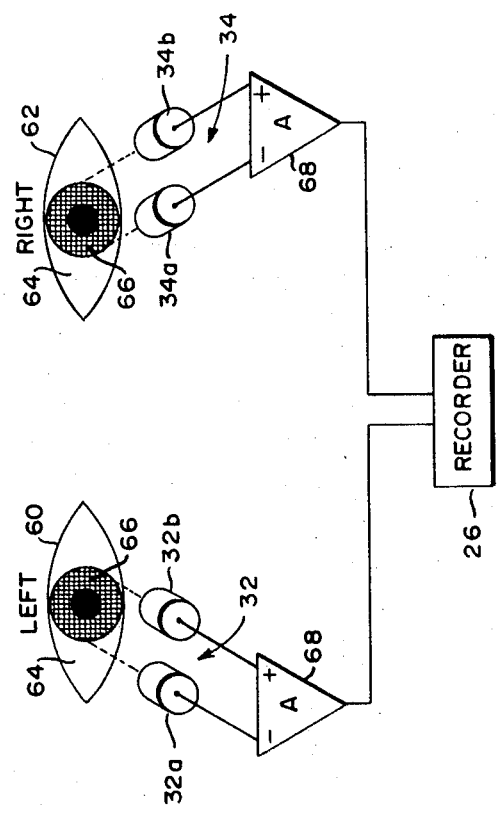
FIG. 7 is a diagrammatic showing of the operation of this invention.

In FIG. 7 the manner in which the photocells 32 and 34 function is suggested. In that figure, left and right eye images 60 and 62 are suggested, each having sclera and iris regions 64 and 66 respectively, and the photocell pairs 32 and 34 are directed to the interface between the sides of the iris and the sclera when the subject's gaze is directed straight ahead. That is, photocell 32a of pair 32 is directed to the left boundary between the sclera 64 and iris 66, while the right photocell 32b is directed to the right boundary between the iris and sclera. The signals from the photocell pair 32 are differentially combined and amplified by amplifier 68, and the output of the amplifier is directed to the recorder 26. A similar arrangement is provided for the photocell pair 34. It will be apparent from an inspection of FIG. 7 that when the eye moves left or right, different amounts of light will be sensed by each photocell of each pair. Specifically, when the eyes move to the left as viewed in FIG. 7, the reflected light sensed by the photocells 32a and 34a will be less than the light sensed when the eye is positioned as shown in the drawing, while the same eye movement will cause an increase in the reflected light sensed by the photocells 32b and 34b. If the head is stationary as the subject reads the material provided, the photocells will sense only movements of the eye. If the photocells are connected differentially, they will minimize the effect of vertical eye movement on the output as transcribed by the recorder 26.

From the foregoing description the manner in which the monitor operates will be apparent. In a room somewhat darkened so as to increase the contrast of the image projected on the screen 28 the subject is positioned with his chin on the rest 20 and his forehead supported by the bars 22. For the comfort the subject may be seated and the frame 18 adjusted so his head is in a comfortable position for the test. The operator may then by means of adjusting the position of the separate mirrors 30 and the panels 41 and 42 which carry the photocell pairs 32 and 34 locate each eye on the screen 28 and position the photocells so that they are directed to the boundaries of the iris and sclera as suggested in FIG. 7. The control knobs 40 and 46 as described make this adjustment possible. The photocells of each pair are separated a distance equal to the average width of a person's iris so that they need not ordinarily be adjusted with respect to each other.

The incandescent lamps 33 provided in the housing will illuminate the subject's eyes so as to increase the sensitivity and response of the monitor. The strip chart paper 70 is heat sensitive, so that as the internal mechanism (not shown) of the recorder moves the paper by the stylii (not shown) the amplified signals from the separate photocell pairs are separately recorded as suggested in FIG. 6. As the eyes move step by step from the left to the right margin of each line, a series of steps are provided in the graph caused by the differential signals produced by the photocells. The chart of FIG. 6 shows that the reader's eyes moved across each line with approximately 5 fixations, and no apparent reading problem may be discerned from the recording. Subjects with reading problems often show regressions, prolonged fixations, or repeats of lines, which is represented on the recording by the track returning to the left margin after moving only part way across the page. This will also show on the chart as an extra peak, i.e. there will be more peaks on the chart than lines of reading material. Another obvious reading problem which will be detected by the monitor is the failure of the two eyes to move together. Many other problems will be made apparent as well. For example, normal optokinetic nystagmus may be revealed by a recording of the type shown in FIG. 6A. Various visual and neurological defects would produce substantive changes in the nystagmus recording. Nystagmus is a term applied to eye movements which are unstable or oscillatory in nature. The most common types are optokinetic, vestibular and spontaneous. Optokinetic nystagmus results from continuously moving a nonhomogeneous visual field past the subject. Examples of this are watching telephone poles out of the window of a moving train and, observing a rotating striped drum. Vestibular nystagmus results from undergoing angular acceleration, as in the case of an aircraft pilot. Spontaneous nystagmus may occur with peripheral gaze and is often indicative of a neurological, vestibular or oculomotor disorder.

From the foregoing description it will be appreciated that an unskilled operator may use the machine without difficulty. The simple adjustments required of the mirrors and panels so as to direct the photocells as the boundaries are very easily carried out. The few control knobs of the recorder are also very easily operated.

What I claim is:

1. A direct reading eye movement monitor comprising, a housing,
    means for steadying the head of the subject,
    a viewing screen on said housing,
    means for projecting a visible image of the subject's eyes onto said screen,
    transducer means disposed adjacent the screen for sensing the interface of two portions of the eye image of different light reflecting properties for producing a signal which is a function of the light reflected by the image,
    means for controlling the relative position of said visible image on said screen and said transducer means to enable alignment of said transducer means with said interface,
    and a recorder connected to the output of the transducer means for recording the signals.

2. A direct reading eye movement monitor as described in claim 1 further characterized by
    a lens system for projecting the image of both eyes of a subject on the screen, and separate transducer means for each eye of the subject.

3. A direct reading eye movement monitor as described in claim 2 further characterized by
    said transducer means being two pairs of independently mounted photocells, one pair for each eye of the subject.

4. A direct reading eye movement monitor as described in claim 2 further characterized by
    said recorder being a two-channel, strip chart recorder with each channel being connected to a transducer means.

5. A direct reading eye movement monitor as described in claim 4 further characterized by
    said viewing screen being mounted on the housing in a position so that it may be observed by an operator,
    and means for moving the transducer means so as to aim each independently at the interface of said portions of said image.

6. A direct reading eye movement monitor as described in claim 5 further characterized by
    a pair of mirrors in the housing positioned to reflect the images of the eyes and project them onto the screen,
    and means for separately adjusting each mirror so that the image of each eye may be moved on the screen independently of the other.

7. A direct reading eye movement monitor as described in claim 6 further characterized by
    an eye illuminator mounted on the housing for lighting the eyes of the subject.

8. A direct reading eye movement monitor as described in claim 3 further characterized by
    means for separately moving each pair of photocells to direct them independently of one another to the interface of each eye image.

9. A direct reading eye movement monitor as described in claim 8 further characterized by
    said means for separately moving each pair of photocells limiting movement of the photocells along one path,
    a pair of mirrors in the housing position to reflect the images of the eyes and project them onto the screen, means for separately adjusting each mirror so that the image of each eye may be moved on the screen independently of the other, and said means for separately adjusting the mirrors moving the eye images on the screen along another path which may cross said one path.

10. A direct reading eye movement monitor as described in claim 9 further characterized by an easel mounted on the housing for supporting reading material to be read by the subject.

11. A direct reading eye movement monitor as described in claim 10 further characterized by said recording being made on heat sensitive paper.

12. A direct reading eye movement monitor as described in claim 1 wherein said means for controlling the relative position of said images and said transducer means comprises means for moving both said transducer means and said eye images relative to one another to aim the transducer means at the interface of said portions of said eye images.

13. A direct reading eye movement monitor as described in claim 3 further characterized by means for moving the eye images and transducer means relative to one another independently for each eye to aim the transducer means at the interfaces independently for each eye.

14. A direct reading eye movement monitor as described in claim 13 further characterized by said means for moving the image and transducer means relative to one another including at least one set of mirrors for moving the eye images on the screen.

15. A direct reading eye movement monitor as described in claim 9 further characterized by nystagmus producing means mounted on the housing.